United States Patent
Duchenay et al.

(10) Patent No.: US 8,412,493 B2
(45) Date of Patent: Apr. 2, 2013

(54) MULTI-DIMENSIONAL MODEL GENERATION FOR DETERMINING SERVICE PERFORMANCE

(75) Inventors: William Duchenay, Cork Co Cork (IE); Paul Basil French, Dublin Pike (IE); Dmitry Mishin, Co Cork (IE); David Mohally, Co. Cork (IE); Thierry Paul Rene Supplisson, Grange Douglas Cork (IE)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/361,015

(22) Filed: Jan. 28, 2009

(65) Prior Publication Data
US 2010/0161290 A1     Jun. 24, 2010

(30) Foreign Application Priority Data
Dec. 22, 2008 (EP) .................................. 08172592

(51) Int. Cl.
*G06F 17/60* (2006.01)

(52) U.S. Cl. .......................................................... 703/2

(58) Field of Classification Search ............ 703/13, 703/6, 1, 2; 705/7, 11; 370/230; 714/144; 455/403, 456.5; 707/102, 103 Y, 1; 702/158; 709/204
See application file for complete search history.

(56) References Cited

U.S. PATENT DOCUMENTS

| | | | |
|---|---|---|---|
| 7,181,450 B2 * | 2/2007 | Malloy et al. .......................... 1/1 |
| 7,243,106 B2 | 7/2007 | Vierich et al. |
| 7,716,253 B2 | 5/2010 | Netz et al. |
| 7,822,662 B2 | 10/2010 | Guzik et al. |
| 7,937,401 B2 | 5/2011 | Pasumansky et al. |
| 2004/0059705 A1 * | 3/2004 | Wittke et al. ....................... 707/1 |
| 2004/0102926 A1 | 5/2004 | Adendorff et al. |
| 2005/0071737 A1 | 3/2005 | Adendorff et al. |
| 2005/0216831 A1 | 9/2005 | Guzik et al. |
| 2005/0223021 A1 * | 10/2005 | Batra et al. ..................... 707/102 |
| 2006/0010164 A1 | 1/2006 | Netz et al. |
| 2006/0019679 A1 * | 1/2006 | Rappaport et al. ......... 455/456.5 |
| 2006/0020933 A1 | 1/2006 | Pasumansky et al. |
| 2006/0229057 A1 * | 10/2006 | Farrugia et al. ............... 455/403 |
| 2008/0114564 A1 * | 5/2008 | Ihara ............................. 702/158 |
| 2008/0168135 A1 * | 7/2008 | Redlich et al. ................ 709/204 |
| 2008/0177593 A1 * | 7/2008 | Clayton et al. .................... 705/7 |
| 2009/0006467 A1 * | 1/2009 | Visscher ................... 707/103 Y |
| 2009/0158240 A1 * | 6/2009 | Zhang et al. .................. 717/104 |
| 2009/0234720 A1 * | 9/2009 | George et al. ................... 705/11 |
| 2010/0149971 A1 * | 6/2010 | Noriega ........................ 370/230 |

* cited by examiner

*Primary Examiner* — Kandasamy Thangavelu
(74) *Attorney, Agent, or Firm* — Yee & Associates, P.C.; Jeffrey S. LaBaw

(57) ABSTRACT

A method of generating a multi-dimensional model comprises receiving data defining multiple resource types, receiving metadata defining a hierarchical organization for one or more resource types, a hierarchical resource type for a respective resource type defining multiple levels of aggregation, and composite resource types for one or more groups of resource types, a composite resource type defining a composition of resource types, and generating the multi-dimensional model from the received data and received metadata, the generating comprising creating a multi-dimensional function for each resource type and for each composite resource type.

20 Claims, 7 Drawing Sheets

Fig. 3

| LOCATION | HANDSET TYPE | SERVICE | START TIME | END TIME | SUCCESS RATE | WEIGHT |
|---|---|---|---|---|---|---|
| CORK | ALL HANDSET TYPES | ALL SERVICES | 01/01/08 00:00 | 01/01/08 23:59 | 0.75 | 134 |
| CLARE | ALL HANDSET TYPES | ALL SERVICES | 01/01/08 00:00 | 01/01/08 23:59 | 0.68 | 169 |
| KENNY | ALL HANDSET TYPES | ALL SERVICES | 01/01/08 00:00 | 01/01/08 23:59 | 0.93 | 192 |

Fig. 4

| LOCATION | HANDSET TYPE | SERVICE | START TIME | END TIME | SUCCESS RATE | WEIGHT |
|---|---|---|---|---|---|---|
| CORK | ALL HANDSET TYPES | ALL SERVICES | 01/01/08 00:00 | 01/01/08 23:59 | 0.75 | 134 |
| CORK | ALL HANDSET TYPES | ALL SERVICES | 01/01/08 00:00 | 01/01/08 00:59 | 0.83 | 17 |
| CORK | ALL HANDSET TYPES | ALL SERVICES | 01/01/08 23:00 | 01/01/08 23:59 | 0.78 | 22 |
| CLARE | ALL HANDSET TYPES | ALL SERVICES | 01/01/08 00:00 | 01/01/08 23:59 | 0.68 | 169 |
| KENNY | ALL HANDSET TYPES | ALL SERVICES | 01/01/08 00:00 | 01/01/08 23:59 | 0.93 | 192 |

| LOCATION | HANDSET TYPE | SERVICE | START TIME | END TIME | SUCCESS RATE | WEIGHT | |
|---|---|---|---|---|---|---|---|
| CORK | ALL HANDSET TYPES | ALL SERVICES | 01/01/08 00:00 | 01/01/08 23:59 | 0.75 | 134 | 17 |
| CORK | ALL HANDSET TYPES | ALL SERVICES | 01/01/08 00:00 | 01/01/08 00:59 | 0.83 | | |
| ... | ... | MMS | ... | ... | ... | ... | |
| CORK | ALL HANDSET TYPES | ALL SERVICES | 01/01/08 23:00 | 01/01/08 23:59 | 0.78 | 0.87 | 22 |
| CLARE | ALL HANDSET TYPES | ALL SERVICES | 01/01/08 00:00 | 01/01/08 23:59 | 0.68 | 169 | |
| KENNY | ALL HANDSET TYPES | ALL SERVICES | 01/01/08 00:00 | 01/01/08 23:59 | 0.93 | 192 | 9 |

| LOCATION | HANDSET TYPE | SERVICE | START TIME | END TIME | SUCCESS RATE | WEIGHT |
|---|---|---|---|---|---|---|
| CORK | ALL HANDSET TYPES | ALL SERVICES | 01/01/08 00:00 | 01/01/08 23:59 | 0.75 | 134 |
| CORK | ALL HANDSET TYPES | MMS | 01/01/08 00:00 | 01/01/08 00:59 | 0.85 | 8 |
| CORK | ALL HANDSET TYPES | SMS | 01/01/08 00:00 | 01/01/08 00:59 | 0.87 | 9 |
| ... | | | | | | |
| CORK | ALL HANDSET TYPES | SMS | 01/01/08 23:00 | 01/01/08 23:59 | 0.78 | 22 |
| CLARE | ALL HANDSET TYPES | ALL SERVICES | 01/01/08 00:00 | 01/01/08 23:59 | 0.68 | 169 |
| KENNY | ALL HANDSET TYPES | ALL SERVICES | 01/01/08 00:00 | 01/01/08 23:59 | 0.93 | 192 |

Fig. 7

| LOCATION | HANDSET TYPE | SERVICE | START TIME | END TIME | SUCCESS RATE | WEIGHT |
|---|---|---|---|---|---|---|
| CORK | ALL HANDSET TYPES | ALL SERVICES | 01/01/08 00:00 | 01/01/08 23:59 | 0.75 | 134 |
| CORK | ALL HANDSET TYPES | MMS | 01/01/08 00:00 | 01/01/08 23:59 | 0.68 | 64 |
| CORK | ALL HANDSET TYPES | SMS | 01/01/08 00:00 | 01/01/08 23:59 | 0.87 | 70 |
| CLARE | ALL HANDSET TYPES | ALL SERVICES | 01/01/08 00:00 | 01/01/08 23:59 | 0.68 | 169 |
| KENNY | ALL HANDSET TYPES | ALL SERVICES | 01/01/08 00:00 | 01/01/08 23:59 | 0.93 | 192 |

| LOCATION | HANDSET TYPE | SERVICE | START TIME | END TIME | SUCCESS RATE | WEIGHT |
|---|---|---|---|---|---|---|
| CORK | ALL HANDSET TYPES | MMS | 01/01/08 00:00 | 01/01/08 23:59 | 0.83 | 68 |
| CORK | ALL HANDSET TYPES | SWS | 01/01/08 00:00 | 01/01/08 23:59 | 0.69 | 64 |
| CLARE | ALL HANDSET TYPES | MMS | 01/01/08 00:00 | 01/01/08 23:59 | 0.77 | 85 |
| CLARE | ALL HANDSET TYPES | SMS | 01/01/08 00:00 | 01/01/08 23:59 | 0.61 | 84 |
| KENNY | ALL HANDSET TYPES | MMS | 01/01/08 00:00 | 01/01/08 23:59 | 0.94 | 95 |
| KENNY | ALL HANDSET TYPES | SMS | 01/01/08 00:00 | 01/01/08 23:59 | 0.92 | 97 |

Fig. 8

MULTI-DIMENSIONAL MODEL GENERATION FOR DETERMINING SERVICE PERFORMANCE

FIELD OF THE INVENTION

This invention relates to a method of generating a multi-dimensional model. The method of multi-dimensional modelling can be used for example, in determining the quality of service measurements for telecommunication networks.

BACKGROUND OF THE INVENTION

In industries such as telecommunications, the monitoring of the performance and delivered quality of a telecommunications network by the owner of the network is a very complex task. To assist in this monitoring, the specification, computation and navigation of Key Performance Indicators (KPIs) and Key Quality Indicators (KQIs) in a telecommunications Service Quality Management (SQM) and Service Level Management (SLM) environment can be used. SQM and SLM systems today typically have the following functions and components, service models, Service Level Agreement (SLA) models and instances, metadata, a computational engine and KQI monitoring.

The service models can include service elements, Key Quality Indicator (KQI) models, Key Performance Indicator (KPI) models and root cause analysis reports. The Service Level Agreement (SLA) models and instances can include SLA clauses, SLA schedules and SLA reports, etc. The metadata for adapters can be used to collect appropriate data from different Operational Support Systems (OSS) including metrics, resource dimensions, database storage and mediation. The computational engine can compute complex KPIs and KQIs and combined KQIs based on a (single) resource dimension, evaluate KQI values against a defined threshold and execute actions on SLA violations (e.g. escalate via email, SNMP, etc.). The KQI monitoring (usually supported by a Root Cause Analysis process) requires a user to drill-down hierarchically on a single dimension usually a via report, view a metric but computed on different dimensions, and view related KQIs on different dimensions.

FIG. 1 illustrates a functional block diagram of a Service Quality Management/Service Level Management system. With the fixed to mobile convergence that is occurring in the telecommunications industry today, as well as the fact that more and more services are being created almost daily, the cardinality of the KQI models and resource dimensions that SQM/SLM systems will have to manage will increase by an order of magnitude. Coupled to the telecommunication network growth is an increasing need from the SQM/SLM platform end-users perspective to be able to slice and dice the received metric information according to multiple dimensions. Such dimensions would typically be the customer (or groups of customers), the type of device being used to access the network (mobile phone, laptop etc) but also geographical and topological dimensions. This new need to compute and present the service quality information according to this ever extending set of dimensions introduces fundamental scalability challenges in terms of hardware requirements to be able to cope with the load introduced by these growing networks.

This increase in KQI models and resource dimensions will require an equivalent increase in processing power and memory to manage them. Current systems- must produce new KPI/KQI models for each metric/dimension combination. This leads to a requirement for a Cartesian product of KQI models which in turn increases the storage, memory, and processor requirements to process the additional models. Root cause analysis and the method of drilling down hierarchically on a dimension (e.g. geographical location and/or across dimensions of the same metric and across to different but related metrics is currently implemented via custom reporting or custom software. This mechanism becomes increasingly labour-intensive in an environment with ever increasing number of services and data sources that need to be supported in a single system. This increases the total cost of ownership of such products.

SUMMARY OF THE INVENTION

The present invention provides a method, system and product of generating a multi-dimensional model comprising receiving data defining multiple resource types, receiving metadata defining a hierarchical organisation for one or more resource types, a hierarchical resource type for a respective resource type defining multiple levels of aggregation, and composite resource types for one or more groups of resource types, a composite resource type defining a composition of resource types, and generating the multi-dimensional model from the received data and received metadata, the generating comprising creating a multi-dimensional function for each resource type and for each composite resource type.

BRIEF DESCRIPTION OF THE DRAWINGS

Embodiments of the present invention will now be described, by way of example only, with reference to the accompanying drawings, in which:

FIGS. 3 to 8 are diagrams of user interface navigation of a model, and

DETAILED DESCRIPTION OF THE INVENTION

Figure 1:
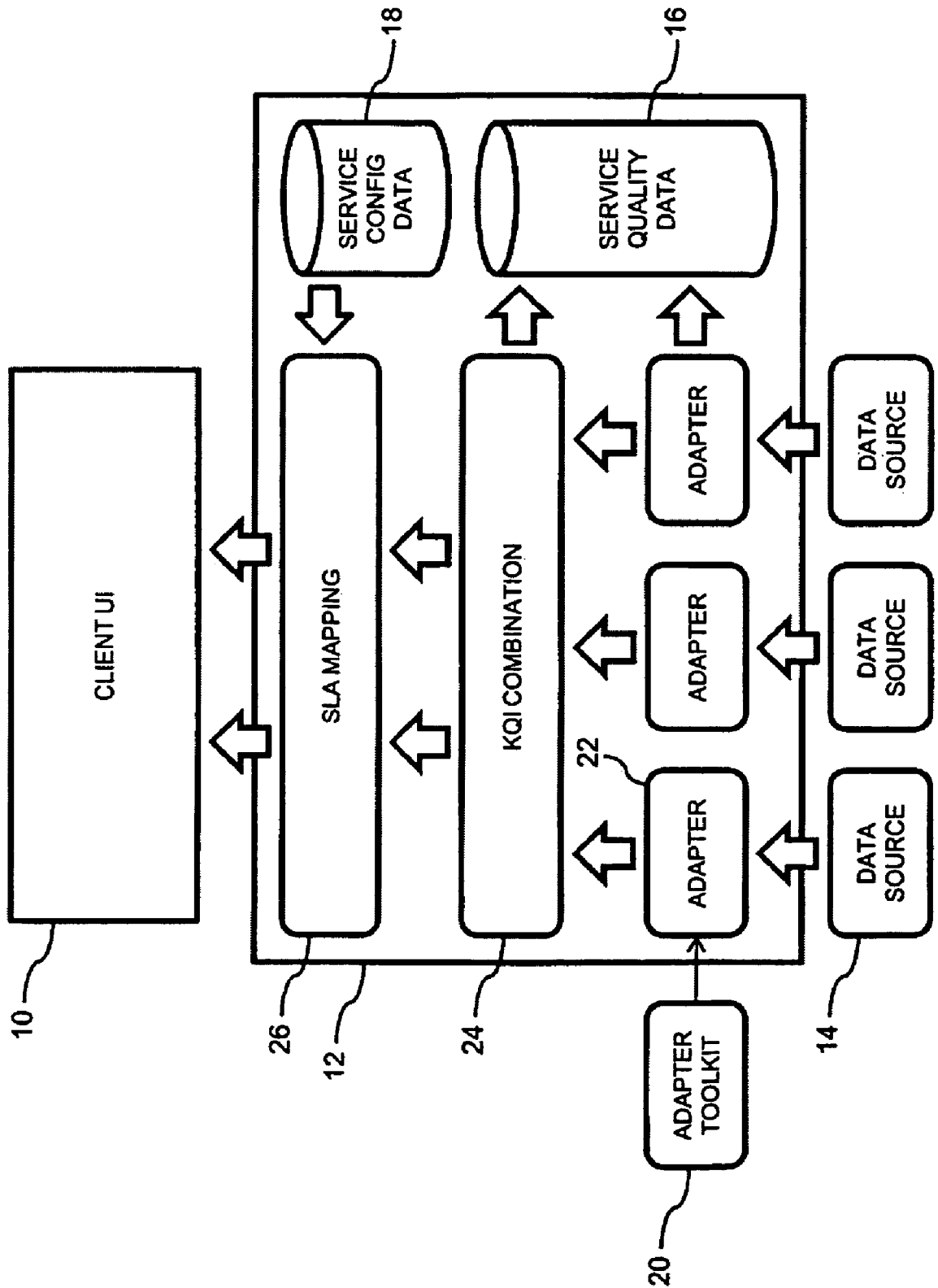
FIG. 1 is a schematic diagram of an SQM/SLA system.

Owing to the invention, it is possible to provide a method that supports the specification, computation and navigation of multi-dimensional Key Performance Indicators (KPIs) and Key Quality Indicators (KQIs) as multi-dimensional functions in a telecommunications Service Quality Management (SQM) and Service Level Management (SLM) environment. This is achieved by the introduction of the concept of a multi-dimensional KQI to reduce the processor and memory load required to manage SQM and SLM schemes. The system supports the multi-dimensional model but when the system receives data from the datasource (for example, a network), the system uses the multi-dimensional model to produce multi-dimensional instances. There would be an instance for every combination of model and resource types.

The introduction of the multiple dimensional modelling for the SQM metrics also facilitates the establishment of new data analysis methods that efficiently help the end-users to drilldown and pinpoint the root cause of service quality issues. The invention satisfies the need for a system and mechanism to reduce the number of models to support such requirements and allows a user to seamlessly and to automatically (i.e. from metadata) drill-down from a high level KQI value down a single dimension hierarchically across dimensions of that value and hierarchically through those other dimensions (drill-across), in accessing the data presented by the model.

Advantageously, the method further comprises presenting data from the multi-dimensional model showing the resource types and respective metrics calculated by the multi-dimensional function for the respective resource type at a specific level of aggregation, receiving a user input selecting a hierarchical resource type and presenting further data from the multi-dimensional model showing the selected resource type and respective metrics calculated by the multi-dimensional function at a lower level of aggregation. The user interface structure and navigation provides a method of navigating the multi-dimensional data in a simple and efficient manner. When a hierarchical resource is selected, then the data at, a lower level of aggregation is presented.

For example, location may be a hierarchical resource, which has the aggregation levels of all locations, region, and area, for example. In the presentation of the data in the model, the data may be first presented for all locations, but the user can provide a user input, for example, by clicking on all locations, to change the level of aggregation to a lower level, thereby drilling down in the data to a more detailed representation of the performance of the network.

Preferably, the step of presenting data from the multi-dimensional model showing the resource types and respective metrics comprises presenting the data in a table format, and the step of presenting further data from the multi-dimensional model showing the selected resource type comprises presenting additional lines in the table format. Using lines in a table is a simple and efficient method of presenting the data. In the example above, in relation to the resource "location", there may be five regions A, B, C, D and E. When the selects all locations, which will have an overall performance metric, the table will be expanded to show new additional lines for the five regions A, B, C, D and E, with the individual performance metrics for each region shown.

Ideally, the user input selecting a hierarchical resource type is of a first predefined type and the lower level of aggregation comprises the level of aggregation directly below the current specific level of aggregation. The first predefined user input type could be the mouse action of left-clicking on a cell in the table, for example. In one embodiment, this will default to the next level down of aggregation. In the location example, after "all locations" as the top level of aggregation, the next lower level of aggregation is "region". When the user left-clicks the "all locations" cell, they are automatically presented with an expansion of this cell which corresponds to the next level down in hierarchy, being "region". The user can therefore drill down in the displayed data to expand the hierarchical resource types with a single click on a cell to bring up the drill down data, thereby splitting the resource type into its component parts, but at the next level of aggregation down.

Additionally, it is advantageous that the user input selecting a hierarchical resource type is of a second predefined type and the method further comprises receiving a further user input selecting the lower level of aggregation. This allows the user to select the specific level of aggregation that is to be used in the expansion of the data presentation. The user could right-click on a cell, and this would bring up a menu which shows the levels of aggregation for the specific resource, and the user could then select the desired level of aggregation to be displayed. The presentation of the model will then be changed to add the data lines representing the specific data resource shown at the selected level of aggregation.

FIG. 1 shows a diagram of an SQM/SLM system, of the type that can be used with a telecommunications network to monitor the performance of the network. A client device 10 such as a conventional desktop computer is connected to a server 12, which is connected to data sources 14. The data sources 14 may be specific parts of the actual network being monitored, or may be independent components that connect into the network to acquire data about the current working performance of the telecommunications network. Such performance data may be such information as the length of time taken to connect a telephone call, number of calls dropped and other metrics about the current status and operational performance of overall network.

The server 12 has various functional components, which may be located in the same piece of hardware, or may be distributed amongst different hardware components within the server 12. The hardware components of the server 12 include processors and databases. Amongst the database components there is included a service quality database 16, which stores service quality data, and also additionally a service configuration database 18, which stores service configuration data. The server 12 also includes an adapter toolkit 20, which is comprised of individual adapters 22. The adaptors 22 connect to the data sources 14 and are arranged to parse the data as it is received from the external network monitoring components 14.

The parsed data from the adapters 14 in the adapter toolkit 20 is then passed, in series, to a KQI combination component 24 and an SLA mapping component 26. These two logical components 24 and 26 are where processing of the parsed data is carried out. This processing is to enable the client device 10 to be able to present reports and data representations to the user, in relation to the telecommunications network being monitored. Various resource types (such as throughput per location), and an associated metric (a numerical value or a percentage etc.) are received as the data and this is used to calculate KPIs and KQIs, in order to provide an understanding of the current network performance. A KQI model is required for each metric/dimension combination, for example, KQI Model 1: Throughput per handset type, KQI Model 2: Throughput per enterprise, KQI Model 3: Throughput per subscriber type, and KQI Model 4: Throughput per location etc.

The enhancement of SQM and SLM systems, in a first embodiment, consists of the following set of software components, multi-dimensional KQI metadata, a multi-dimensional KQI computational engine and a multi-dimensional drill-down engine and associated user interface.

The multi-dimensional KQI metadata component consists of the metadata definition of what constitutes a multi-dimensional KQI model. It introduces the concepts of hierarchical resource types and composite resource types. This allows the system to simplify what is exposed to the end user by putting an 'umbrella' resource type at the top of a set of dimensions. The end user is 'virtually' exposed to a single dimension. The concept of a hierarchical resource is combined with the composite resource type in order to, once again, simplify the degree of complexity of the information presented to the end-user. The multi-dimensional KQI computational engine is an extension of KQI computational software processes and its purpose is to compute and store multi-dimensional KQIs. The multi-dimensional drill-down engine and the associated user interface is an interface and database access software component to allow drill-down on a multi-dimensional KQI.

Figure 2:
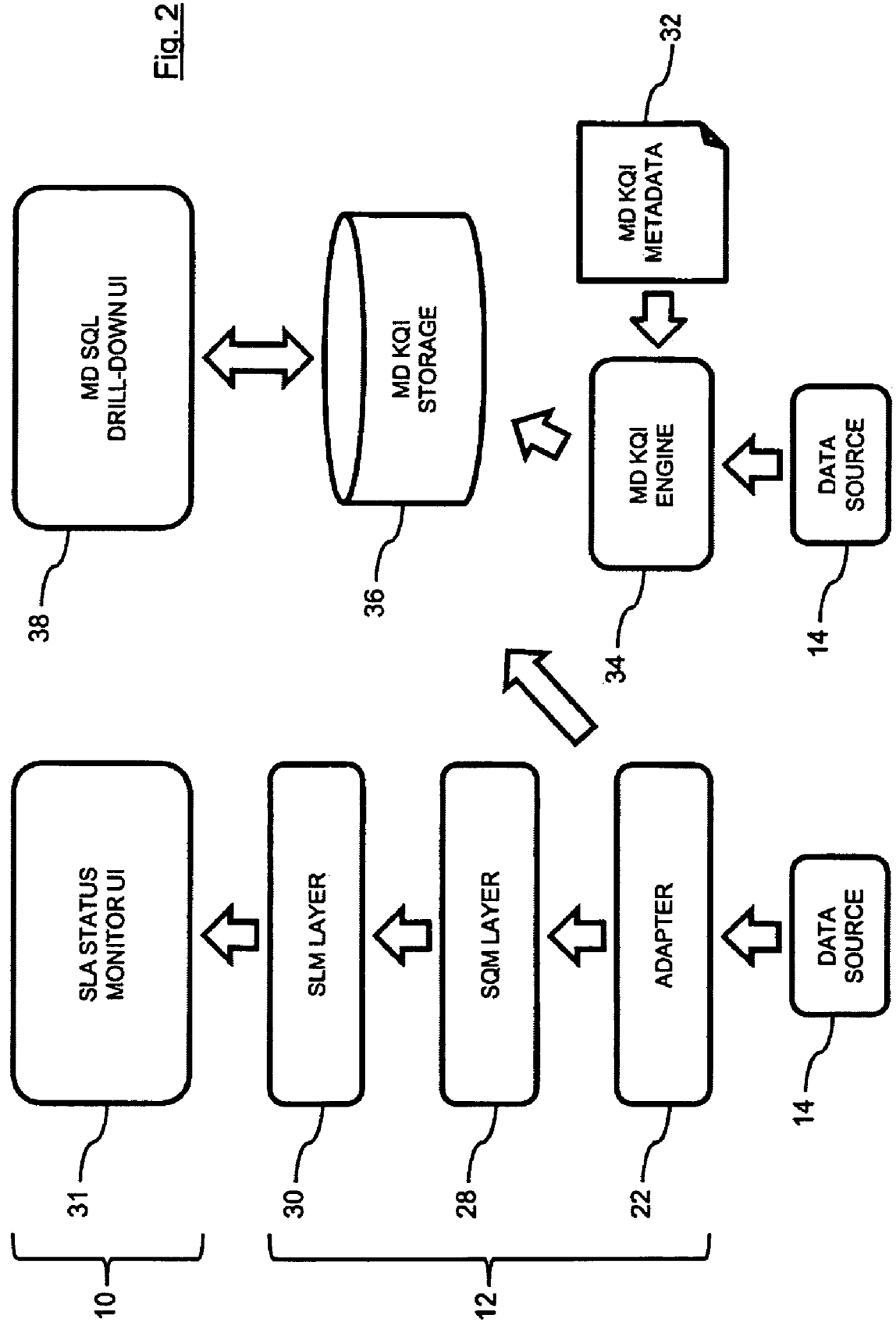
FIG. 2 is a schematic diagram of an improved SQM/SLA system.

The software components of the multi-dimensional KQI system are illustrated in FIG. 2. The current SQM/SLM system components are illustrated on the left hand side of the Figure, and include a data source 14, which is an Operational Support System (OSS) which supplies quality data to the SQM/SLM system. This connects to the adapter 22, which is the name for a software component which parses the native OSS data. Current adapters compute and store single-dimensional KQIs.

The adapter 22 provides an output to an SQM layer 28. This layer 28 is responsible for producing metrics (KPI and KQI) and storing them in the repository. Such metrics can be produced across multiple dimensions and combined with each other, taking into account the dimensions they apply to. For example, to be able to combine two multi-dimensions metrics, some common dimension across metrics must exist. The SQM layer 28 connects to an SLM layer 30. The purpose of this layer 30 is to perform various tasks including, associating a KQI with a Service Level Agreement (SLA), comparing the value of the KQI with the threshold set in the SLA, generating an SLA violation if the value of the KQI exceeds the threshold value, and forwarding the SLA clause value and status to the SLA status monitor user interface 31.

The new components as per the improved system are multi-dimensional KQI metadata 32, a multi-dimensional KQI computational engine 34 and a multi-dimensional SQL drill-down engine and user interface 38, which presents information and can receive user inputs. The multi-dimensional KQI metadata component 32 consists of the metadata definition of what constitutes a multi-dimensional KQI model. It introduces the concept of hierarchical resource types and composite resource types, described in more detail below. The multi-dimensional KQI computational engine is an extension of current KQI computational software processes and its purpose is to compute and store multi-dimensional KQIs. The engine creates a multi-dimensional function for each resource type and for each composite resource type.

A resource type is defined with at least two aggregation levels: non-aggregated and total. The total level is associated with the resource which is the result of aggregation across all possible resources of a given resource type. For example, a resource type customer may be defined as [all_customers, customer], where "all_customers" here corresponds to total aggregation.

A hierarchical resource type is composed from resource types where the main hierarchical dependencies may be identified. For example, a hierarchical resource type called location could be defined as (all_locations, region, area). Here, "all_locations" in the given sample corresponds to total aggregation. The hierarchy levels (region, area) are considered as distinct aggregation levels in the scope of hierarchical resource type rather than individual resource types.

The composite resource types are defined as a composition of resource types (both hierarchical and non-hierarchical). For example, the composite resource type customer_per_location could be defined as [customer, location]. When the same resource type is used in a composite resource type more than once, then a 'role' attribute shall be used to distinguish between different instances of given resource type. For example, in composite resource type [customer, location (source), location (target)] roles 'source' and 'target' are used to qualify two entries of service resource type location. A composite resource type is not associated itself with resources of this type, but with sets of resources belonging to composing resource types.

To facilitate support of resource properties for composite resource types some individual resource types may be designated to implement such property. For example, for composite resource type customer_per_location the location resource type may be designated to be used when time zone of resource is required. When resource type belongs to more than one logical hierarchy, the main hierarchy (or no hierarchy) is selected and used as a base for resource type definition. The additional hierarchies are added as different service resource types into the corresponding composite resource type.

The Cartesian product of aggregation levels for resource types would be used as set of supported aggregation levels for the resulting composite resource type. For example, for the composite resource type customer_per_location, where the location dimension is organized hierarchically into (area→region→all_location) the set of aggregation levels would be [(all_customers, all_locations), (all_customers, region), (all_customers, area), (customer, all_locations), (customer, region), (customer, area)].

A KQI model could be associated with a hierarchical resource type or with a composite resource type as well as with non-hierarchical resource type. A KQI model shall be associated with some aggregation level which belongs to associated resource type (base level). By default it shall be lowest (least aggregated) level of the associated resource type. A KQI model may be associated with aggregation algorithm so not only is there a KQI associated with the base level but also a KQI associated with aggregated resources (sets of resources) would be produced as well. When a KQI model is defined as the composition of the other KQI models then the resource matching is done based on composing service resource types and their roles rather than on composite resource types.

The resource types are ignored by computation when no match with the corresponding resource type in the target KQI model is found. This could be done either by taking total aggregation level or by ignoring this service resource. For example, when computation A[customer]=B[customer_per_location]+C[customer], the combination could be done as:

$A[\text{Customer1}]=B[\text{Customer1}, \text{AnyLocation}]+C[\text{Customer1}]$ or as:

$A[\text{Customer1}]=\text{aggregate}(B[\text{Customer1}, \text{Area1}], \ldots, B[\text{Customer1}, \text{AreaN}])+C[\text{Customer1}]$ The first approach is preferable and shall be automatically selected by the system as this approach requires less memory. A KQI shall also be associated with an aggregation level. The aggregation level shall correspond to aggregation level of the resource (the set of resources) associated with KQI.

The enhanced system also includes the multi-dimensional SQL drill-down engine and user interface 38. The method of generating the overall model allows navigation through multiple projections of multidimensional data without layout change, thus simplifying the navigation. The data is represented, in the user interface 38, in a tabular form. Each hierarchical dimension (including time) is represented as a table column. FIG. 3 shows an initial data projection. Each column in the table represents either a resource type (the first five columns) or a metric (the final two columns). The first resource type, location, has been expanded into areas, dropping down a hierarchy level from "all_locations". Each line in the table represents the current network performance for the area listed in the first column.

Clicking on a data cell in the table allows a user to drill down using the selected dimension. By default (for example in response to a double click) a projection for this dimension is changed to one level down, in terms of hierarchy. A new projection is added to the table as extra nested rows. The selected row is used as a filter expression to sub-select the nested rows. For example, by selecting the start time column in the first data row and by changing the aggregation level for "day" to "hour" the table would be modified to that shown in FIG. 4, where drilling down by the time dimension has taken place.

The user has double-clicked the cell 40 (highlighted for ease of understanding) and this has caused an expansion of the row containing the cell to take place. The expansion of the row is to subdivide the original row into new rows (indented to illustrate the expansion), according to the selected resource type. As mentioned above, the default expansion is to drop down to the next level in the hierarchy. In this case the time resource at the aggregation level of "day" has been split into "hours". The table could also include the user interface property of allowing the user to right-click on a cell and select the desired level of aggregation, rather than the default.

The drill down algorithm discussed above is recursive. For example, when the service cell in the second data row is selected, the new constituent rows (if any) would be added to output. FIG. 5 shows the result of the drill down by time, followed by drill down by service.

Clicking on a data cell (in a row which is already expanded) allows either cancelling of the current drilldown and using a new drilldown projection or the adding of the new dimension to the current drilldown. Recursive output rows (e.g. row 3 on the FIG. 5) are discarded. For example, by selecting the Service cell in the first row, the user could get either drill down by the Service and Start time (FIG. 6) or drill down by the Service only (FIG. 7). FIG. 6 shows a drill down by time and service, and FIG. 7 shows a drill down by service alone.

Clicking on the header cell could be used to change top level perspective. All rows produced by drill down would be closed when top level perspective is changed. This is shown in FIG. 8 for example. Here the user has clicked the cell entitled "service", which is the column heading for this resource type. The result of this action is to close all sub-lines that have been opened previously and expand the service resource to the next lower level of aggregation, being the two types MMS and SMS. The metrics shown in the two right hand columns now reflect the aggregation shown by this split in the service resource type.

Figure 9:
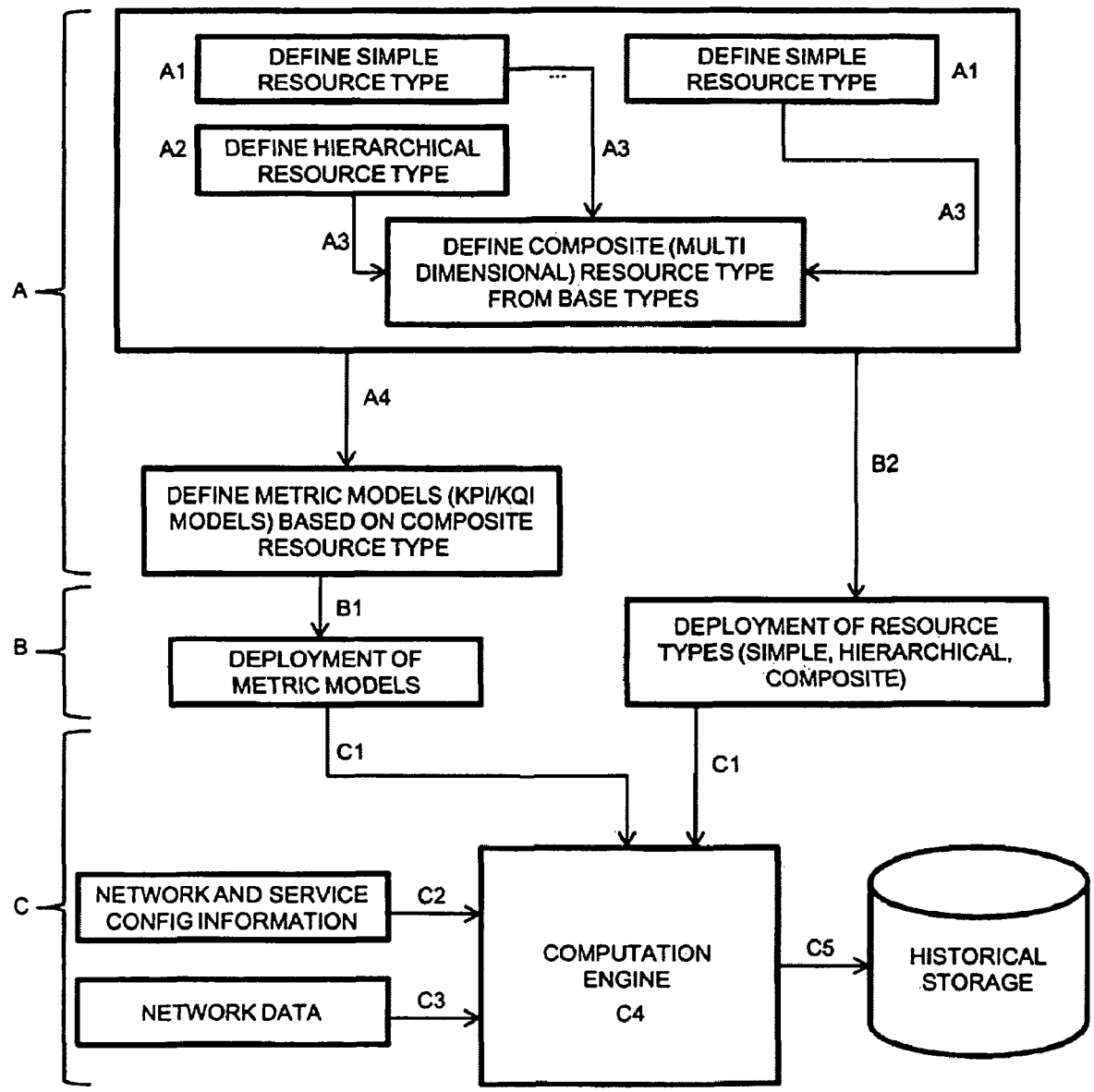
FIG. 9 is a flowchart of a method of generating a multi-dimensional model.

The steps in creating and deploying the multi-dimensional model are illustrated in FIG. 9. The steps can be grouped in three sub-groups namely A. Define, B. Deploy and C. Instantiate. See below for examples of metadata defining Resource Type (Basic, Hierarchical and Composite), KQI models (Simple and Combined).

The define subgroup involves defining the metadata for the Resource Type and KQI Models. See the Resource Type, Simple KQI Model and Combined KQI Model metadata examples. A.1 is the step of Defining simple basic Resource Type, A.2 is Define Hierarchical Resource type with multiple levels. (e.g. SGSNMobMgmtHierarchy example metadata) and A.3 is Define a Composite (or Multi-Dimensional) Resource Type from 2 or more Simple or Hierarchical resource types (e.g. SGSNPapuDataHierachy in example metadata). The step A.4 is the step of defining KQI models which are specific algorithms dimensions by a (Simple, Hierarchical or Composite) Resource Type. The deploy subgroup is concerned with deploying the models (Resource Types, KQI Models) on a system. Step B.1 is the Deploy Resource Types and step B.2 is Deploy KQI models (Simple and/or Combined).

The instantiate subgroup involves a computed system computationally instantiating instances of KQIs based on the Resource Type and KQI model metadata. Note that there can be many instances of a single model. There will be one instance for each Resource instance, e.g. if there were 50 SGSNs in a network, then 50 instances of a KQI model which was based on an SGSN Resource Type would be created each time this system would retrieve relevant data from the network. The steps in this subgroup are C.1 computation engine reads the metadata (Resource Types, KQI models), C.2 computation engine reads network configuration data (Resource instances, topology information, etc.), C.3 computation engine reads metric data and resource dimensions from the network, C.4 computation engine computes multi-dimensional KQI instances, and C.5 computation engine stores instances in a data store for historical analysis.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The program can be transferred from the storage of one system, a server system, to the storage of another system coupled to the network, remote to the server system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of generating a multi-dimensional model that is operable to determine performance of a service, comprising:
   Receiving, using a computer, data defining multiple resource types,
   receiving, using the computer, metadata defining (i) a hierarchical organization for one or more of the multiple resource types, including a hierarchical resource type for a respective resource type defining multiple levels of aggregation, and (ii) composite resource types for one or more groups of the resource types, a composite resource type of the composite resource types defining a composition of certain resource types of the resource types,
   generating, using the computer, the multi-dimensional model from the received data and received metadata, the generating comprising creating a multi-dimensional function for each resource type and for each composite resource type within the received data and metadata;
   receiving, using the computer, service data associated with the service; and
   processing, using the computer, the service data by the multi-dimensional model to determine the performance of the service.

2. The method according to claim 1, and further comprising presenting data from the multi-dimensional model showing the resource types and respective metrics calculated by the multi-dimensional function for the respective resource type at a specific level of aggregation, receiving a user input selecting a hierarchical resource type and presenting further data from the multi-dimensional model showing the selected resource type and respective metrics calculated by the multi-dimensional function at a lower level of aggregation.

3. The method according to claim 2, wherein the step of presenting data from the multi-dimensional model showing the resource types and respective metrics comprises presenting the data in a table format, and the step of presenting further data from the multi-dimensional model showing the selected resource type comprises presenting additional lines in the table format.

4. The method according to claim 2, wherein the user input selecting a hierarchical resource type is of a first predefined type and the lower level of aggregation comprises the level of aggregation directly below a current specific level of aggregation.

5. The method according to claim 2, wherein the user input selecting a hierarchical resource type is of a second predefined type and the method further comprises receiving a further user input selecting the lower level of aggregation.

6. The method according to claim 1, wherein a plurality of multi-dimensional functions are created from the multi-dimensional model such that a given instance of the multi-dimensional model is created for each combination of the multi-dimensional model and the resource types to form a plurality of multi-dimensional model instances.

7. The method according to claim 6, wherein at least one of the plurality of multi-dimensional model instances is defined as a composition of at least one other of the plurality of multi-dimensional model instances.

8. A system for generating a multi-dimensional model that is operable to determine performance of a service, comprising:
   a data source arranged to receive data defining multiple resource types,
   a tangible database device arranged to receive metadata defining (i) a hierarchical organization for one or more of the multiple resource types, including a hierarchical resource type for a respective resource type defining multiple levels of aggregation, and (ii) composite resource types for one or more groups of the resource types, a composite resource type of the composite resource types defining a composition of certain resource types of the resource types,
   a computational engine arranged to generate the multi-dimensional model from the received data and received metadata, the generating comprising creating a multi-dimensional function for each resource type and for each composite resource type within the received data and metadata;
   an adapter arranged to receive service data associated with the service from a network; and
   wherein the multi-dimensional model processes the service data to determine the performance of the service.

9. The system according to claim 8, and further comprising a user interface arranged to present data from the multi-dimensional model showing the resource types and respective metrics calculated by the multi-dimensional function for the respective resource type at a specific level of aggregation, and arranged to receive a user input selecting a hierarchical resource type and presenting further data from the multi-dimensional model showing the selected resource type and respective metrics calculated by the multi-dimensional function at a lower level of aggregation.

10. The system according to claim 9, wherein the user interface is arranged, when presenting data from the multi-dimensional model showing the resource types and respective metrics comprises, to present the data in a table format, and, when presenting further data from the multi-dimensional model showing the selected resource type, to present additional lines in the table format.

11. The system according to claim 9, wherein the user input selecting a hierarchical resource type is of a first predefined type and the lower level of aggregation comprises the level of aggregation directly below the current specific level of aggregation.

12. The system according to claim 9, wherein the user input selecting a hierarchical resource type is of a second predefined type and wherein the user interface is arranged to receiving a further user input selecting the lower level of aggregation.

13. The system according to claim 8, wherein a plurality of multi-dimensional functions are created from the multi-dimensional model such that a given instance of the multi-dimensional model is created for each combination of the multi-dimensional model and the resource types to form a plurality of multi-dimensional model instances.

14. The system according to claim 13, wherein at least one of the plurality of multi-dimensional model instances is defined as a composition of at least one other of the plurality of multi-dimensional model instances.

15. A computer program product comprising computer executable instructions stored on a non-transitory computer readable storage medium which when executed on a computing device executes a method for generating a multi-dimensional model that is operable to determine performance of a service, the product comprising instructions for:
receiving data defining multiple resource types,
receiving metadata defining (i) a hierarchical organization for one or more of the multiple resource types, including a hierarchical resource type for a respective resource type defining multiple levels of aggregation, and (ii) composite resource types for one or more groups of the resource types, a composite resource type of the composite resource types defining a composition of certain resource types of the resource types,
generating the multi-dimensional model from the received data and received metadata, the generating comprising creating a multi-dimensional function for each resource type and for each composite resource type within the received data and metadata;
receiving service data associated with the service; and for processing the service data by the multi-dimensional model to determine the performance of the service.

16. The computer program product according to claim 15, wherein the method further comprises presenting data from the multi-dimensional model showing the resource types and respective metrics calculated by the multi-dimensional function for the respective resource type at a specific level of aggregation, receiving a user input selecting a hierarchical resource type and presenting further data from the multi-dimensional model showing the selected resource type and respective metrics calculated by the multi-dimensional function at a lower level of aggregation.

17. The computer program product according to claim 16, wherein the presenting data from the multi-dimensional model showing the resource types and respective metrics comprises presenting the data in a table format, and the step of presenting further data from the multi-dimensional model showing the selected resource type comprises presenting additional lines in the table format.

18. The computer program product according to claim 15, wherein the instructions are stored in a computer readable storage medium in a data processing system, and wherein the instructions were downloaded over a network from a remote data processing system.

19. The computer program product according to claim 15, wherein the instructions are stored in a computer readable storage medium in a server data processing system, and wherein the instructions are downloaded over a network to a remote data processing system for use in a computer readable storage medium with the remote system.

20. The computer program product according to claim 15, wherein a plurality of multi-dimensional functions are created from the multi-dimensional model such that a given instance of the multi-dimensional model is created for each combination of the multi-dimensional model and the resource types.

* * * * *